US010845671B2

United States Patent
McManamon et al.

(10) Patent No.: US 10,845,671 B2
(45) Date of Patent: Nov. 24, 2020

(54) SYSTEM, METHOD AND APPARATUS FOR NON-MECHANICAL OPTICAL AND PHOTONIC BEAM STEERING

(71) Applicant: Exciting Technology, LLC, Dayton, OH (US)

(72) Inventors: Paul F. McManamon, Dayton, OH (US); Abtin Ataei, Dayton, OH (US)

(73) Assignee: Exciting Technology, LLC, Dayton, OH (US)

( * ) Notice: Subject to any disclaimer, the term of this patent is extended or adjusted under 35 U.S.C. 154(b) by 40 days.

(21) Appl. No.: 15/796,055

(22) Filed: Oct. 27, 2017

(65) Prior Publication Data
US 2019/0129275 A1 May 2, 2019

(51) Int. Cl.
*G02F 1/29* (2006.01)

(52) U.S. Cl.
CPC .............. *G02F 1/29* (2013.01); *G02F 2201/12* (2013.01); *G02F 2203/24* (2013.01)

(58) Field of Classification Search
CPC .............................. G02F 1/292; G02F 2201/12
USPC .................................................. 359/315, 322
See application file for complete search history.

(56) References Cited

U.S. PATENT DOCUMENTS

| 5,987,041 A | 11/1999 | Taniguchi et al. |
| 6,373,620 B1 | 4/2002 | Wang |
| 6,400,855 B1 | 6/2002 | Li et al. |
| 6,456,419 B1 | 9/2002 | Winker et al. |
| 6,556,260 B1 * | 4/2003 | Itou .................. G02F 1/133603 349/69 |
| 6,746,618 B2 * | 6/2004 | Li ........................ C04B 35/493 252/62.9 R |
| 8,654,292 B2 * | 2/2014 | Kubota ............. G02F 1/134363 349/138 |
| 10,386,489 B2 | 8/2019 | Albelo et al. |
| 2004/0135965 A1 * | 7/2004 | Holmes .................. G02F 1/292 349/202 |

(Continued)

FOREIGN PATENT DOCUMENTS

| WO | PCT/US2019/023915 | 3/2019 |
| WO | 2020086111 A1 | 4/2020 |
| WO | 2020086692 A1 | 4/2020 |

OTHER PUBLICATIONS

Hatcher, ""Granularity of beam positions in digital phased arrays"", Proceedings of the IEEE (vol. 56, Issue: 11, Nov. 1968), Nov. 1968, pp. 1795-1800.

(Continued)

*Primary Examiner* — Mahidere S Sahle
(74) *Attorney, Agent, or Firm* — GTC Law Group PC & Affiliates

(57) ABSTRACT

This disclosure teaches a thin film beam steering system comprising either flat or tilted transparent electrodes on one side of the electro-optical crystal layer and a transparent ground electrode on the other side. There is an insulator between each adjacent electrode which can be inserted all the way or partially through the EO crystal layer. A mirror layer can also be attached to the ground electrode. The refractive index of the EO crystal layer is changeable as a function of varying an applied voltage generated by the voltage supply and applied to the EO crystal layer. The disclosure also includes bulk crystal beam steering systems to steer a beam in 2 dimensions and to a wider angle.

11 Claims, 18 Drawing Sheets

(56) References Cited

U.S. PATENT DOCUMENTS

| | | | |
|---|---|---|---|
| 2005/0265403 A1* | 12/2005 | Anderson | H01S 5/143 |
| | | | 372/20 |
| 2008/0212007 A1 | 9/2008 | Meredith | |
| 2008/0247031 A1 | 10/2008 | Wasilousky | |
| 2017/0269453 A1* | 9/2017 | Galstian | G02F 1/1337 |
| 2018/0136538 A1 | 5/2018 | Khan | |
| 2018/0275394 A1 | 9/2018 | Yeoh et al. | |

OTHER PUBLICATIONS

McManamon, et al., ""Broadband optical phased-array beam steering"", Opt. Eng. 44, 128004, 2005, Dec. 2005, pp. 1-5.

McManamon, et al., ""Nonmechanical beam steering for active and passive sensors"", Downloaded From: https://www.spiedigitallibrary.org/conference-proceedings-of-spie on Aug. 22, 2019 Terms of Use: https://www.spiedigitallibrary.org/terms-of-use, 1993, pp. 1-10.

McManamon, et al., ""Optical Phased Array Technology"", Proc. IEEE 84(2), 268-298,, Feb. 1996, pp. 268-298.

PCT/US2019/023915, "International Application Serial No. PCT/US2019/023915, International Search Report and Written Opinion dated Jul. 18, 2019", Exciting Technology LLC, 15 pages.

PCT/US2019/023915, "International Application Serial No. PCT/US2019/023915, Invitation to Pay Additional Fees and, Where Applicable, Protest Fee dated May 29, 2019", Exciting Technology LLC, 2 pages.

Thalhammer, et al., ""Speeding up liquid crystal SLMs using overdrive with phase change reduction"", Jan. 28, 2013 / vol. 21, No. 2 / Optics Express p. 1779-1797, Jan. 2013, pp. 1779-1797.

Wang, et al., ""Spatial resolution limitation of liquid crystal spatial light modulator"", Liquid Crystal Conference, Great Lakes Photonics Symposium, Cleveland, OH Jun. 7-11, 2004, Oct. 2004, pp. 45-57.

PCT/US19/57616, "International Application Serial No. PCT/US19/57616, International Search Report and Written Opinion dated Jan. 13, 2020", Exciting Technology LLC, 10 pages.

* cited by examiner

Prior Art

SYSTEM, METHOD AND APPARATUS FOR NON-MECHANICAL OPTICAL AND PHOTONIC BEAM STEERING

GOVERNMENT CONTRACT

This invention was made with government support under grant # FA8650-16-C-1750 and awarded by the United States Air Force through the prime contractor Boulder Nonlinear Systems, Inc. The government has certain rights in the invention.

FIELD OF THE DISCLOSURE

This disclosure relates to the field of optical beam steering. More particularly, this disclosure relates to thin film and bulk crystal beam steering approaches, with no moving parts.

BACKGROUND

Steering an optical beam without moving parts requires the ability to change the phase front exiting an optical device compared to the phase front entering a device. The direction a beam is travelling is perpendicular to the phase front of the beam. Traditionally, the phase front of an optical beam and the direction the beam is travelling, is changed by moving a mirror or a transparent optical element. There are two fundamental non-mechanical methods of creating a phase difference across an optical beam resulting in a steered optical beam. One method is to create an optical path delay ("OPD"), which is equivalent to a phase delay for a certain wavelength, and the other is to directly create a phase delay. The direct phase approach derives from the paper by S. Pancharatnam, in Proceedings of the Indian Academy of Sciences, vol XLI, no. 4, sec. A, 137, 1955. Some of the background of this invention is discussed in "A review of phased array steering for narrow-band electro-optical systems", by Paul F McManamon, Philip J Bos, Michael J Escuti, Jason Heikenfeld, Steve Serati, Huikai Xie, Edward A Watson. This paper discusses these technologies and is incorporated herein by reference in its entirety for all purposes.

Light could be steered without mechanical motion if we could electronically write a prism. The problem with this approach is that it is difficult to create an OPD as large as would be required to write a full prism of appreciable width. For example, a 10-cm wide aperture steering to 30 degrees would require >5 cm OPD on the thick side of the prism. However, for a narrow wavelength, it is advantageous that light is a sine wave.

With a sine wave it does not matter if there is a 0, $2\pi$, $4\pi$ or $2n\pi$ phase shift. The unfolded phase profile is the same. Therefore, as one moves across the width of the prism, an OPD can be created that subtracts $2\pi$ of phase or one wavelength every time the phase reaches $2\pi$, resulting in a sawtooth OPD and a sawtooth phase profile. When the phase profile is unfolded, it is the same for the design wavelength as the profile resulting from light travelling through a prism. Resets any multiple of $2\pi$ or any multiple of one wavelength can be achieved. If resets are done perfectly, the unfolded phase at the design wavelength looks like the phase profile that would result from propagation through a prism and steers light in the same manner as a phase shift resulting from light travelling through a prism.

A modulo $2\pi$ phase profile should be interpreted to mean a $2\pi n$ phase profile, with resets of any multiple of one wavelength of OPD. Discrete increment modulo $2\pi$ beam steering is shown in FIG. 1. In the example shown in FIG. 1, discrete steps are used to build up to one wavelength, or $2\pi$ phase shift. For example, discrete steps of 0, 30, 60, 90, 120, 150, 180, 210, 240, 270, 300, and 330 degrees can be used, and then back to 0 degrees instead of going to 360 degrees, because 0 degrees and 360 degrees are the same in a sine wave. This is what would result from individual electrodes imposing an index change on a material, ignoring any fringing field effects. The benefit of using a modulo $2\pi$ phase profile is that the required OPD can be small, on the order of a single wavelength.

The maximum required OPD is approximately equal to the wavelength of the light being steered, or some multiple of the wavelength of light being steered. The modulo $2\pi$ steering approach makes the beam steerer very wavelength-dependent. This wavelength dependence is called dispersion by those who are skilled in the art. It means different wavelengths are steered to different angles. This wavelength dependence is discussed in: P. F. McManamon, E. A. Watson, T. A. Dorschner, L. J. Barnes, "Nonmechanical beam steering for active and passive sensors," SPIE 1417, 110, 1991, p 194. It is further discussed in P. F. McManamon, J. Shi, and P. Bos, "Broadband optical phased-array beam steering," Opt. Eng. 44, 128004, 2005.

An important parameter for beam steering is steering efficiency, which is defined as how much of the light input to the steering unit is sent in the desired direction compared to the light entering a steering device. Different definitions of steering efficiency can be used, but the exact definition is not relevant to the value of the technology in this disclosure. Regardless of the definition used for steering efficiency, this disclosure teaches methods of increasing steering efficiency.

A major efficiency issue with any modulo $2\pi$ beam steering system is "fly-back," which refers to the spatial distance required to reduce the OPD from approximately a multiple of one wavelength, or $2\pi n$ phase shift, to near zero. Reducing the OPD from that which results in a $2\pi n$ phase shift to zero means from approximately $2\pi n$ to approximately zero. There are various embodiments and techniques for specifying the exact OPD level from which a reset subtracts OPD. While each of these techniques reduce the OPD by $2\pi n$ in phase for the design wavelength, they do not all start at exactly an OPD that results in a $2\pi n$ phase shift, but can start at somewhat higher or lower values that are close to $2\pi n$, and can end at values that are somewhat higher or lower than zero.

One approach to determine the value from which OPD is subtracted is given in Gregor Thalhammer, Richard W. Bowman, Gordon D. Love, Miles J. Padgett, and Monika Ritsch-Marte, "Speeding up liquid crystal SLMs using overdrive with phase change reduction," 28 Jan. 2013/Vol. 21, No. 2/OPTICS EXPRESS p 1779-1797. Fine angular beam steering may also result in subtracting the reset from a value not exactly an increment of $2\pi n$ phase shift. The article by Burrell R. Hatcher, "Granularity of beam positions in digital phased arrays," Proceedings of the IEEE (Volume: 56, Issue: 11, November 1968, teaches very fine angular steering using a phased array, but initiating the subtraction of a multiple of one wavelength of OPD from a value that is not an exact multiple of one wavelength of OPD, or $2\pi n$ of phase. The fly-back effect is a result of the inability of the device to change its voltage profile instantaneously between two sets of electrodes, which is shown in FIG. 2. The fly-back region in FIG. 2 is the region for which the OPD or phase decreases as the distance increases.

Many modulo 2π steering embodiments, such as liquid crystals, or an electro-optical crystal, create an index change in one polarization as a result of applying an Electric, or E, field in the device. The inability to precisely control those electric fields due to fringing effects results in similar inability to rapidly change phase shifts, and an inability to create a sharp index change and a sharp OPD change, therefore an inability to rapidly change OPD. The fly-back region reduces the fill factor of the optical grating where fill factor is defined as the percentage of the beam steered in the desired direction.

Fringing fields are the main reason for a fly-back region greater than zero. For liquid crystals there can also be an inability of the liquid crystal to change orientation quickly, but fringing fields are often a more limiting effect. FIG. 2 shows that during the fly-back portion of the phase profile the beam steers in the wrong direction. The following equation gives the efficiency due to fly-back effects.

$$\eta = \left(1 - \frac{\Lambda_F}{\Lambda}\right)^2$$

Here $\eta$ is efficiency, $\Lambda_F$ is the width of the fly-back region, and $\Lambda$ is the width between resets. This equation is taken from P. F. McManamon, T. A. Dorschner, D. C. Corkum, L. J. Friedman, D. S. Hobbs, M. K. O. Holz, S. Liberman, H. Nguyen, D. P. Resler, R. C. Sharp, and E. A. Watson, "Optical Phased Array Technology," Proc. IEEE 84(2), 268-298, 1996. This is the fringing field limited steering efficiency. The following equation provides fly-back distance vs steering efficiency.

$$\Lambda_F = \Lambda(1 - \sqrt{\eta})$$

FIG. 2 shows fringing fields make it impossible to impose an electric field that results in one electrode, or less, wide resets while using small electrodes and steering to large angles. As a rule of thumb, the narrowest width of a reset is about the thickness of the device layer between the electrodes and the ground plane, as discussed in X. Wang, B. Wang, P. F. McManamon, J. J. Pouch, F. A. Miranda, J. E. Anderson, P. J. Bos, "Spatial resolution limitation of liquid crystal spatial light modulator," Liquid Crystal Conference, Great Lakes Photonics Symposium, Cleveland, Ohio Jun. 7-11, 2004.

Fringing fields can have a significant limiting effect on current generation modulo 2π beam steering devices. For transmissive beam steering the cell has to be at least approximately as thick as required to obtain one wavelength, or generate 2π phase, of OPD. A birefringence of 0.3 means the cell has to be about 3.3 times one wavelength in thickness. Table 1 gives steering efficiency for a 0.35 index of refraction change using transmissive beam steering.

TABLE 1

Efficiency vs. Angle limited by fringing field effects

| Angle (deg) | Angle (rad) | Index change | Efficiency |
| --- | --- | --- | --- |
| 20 | 0.349 | 0.35 | 0.0% |
| 15 | 0.262 | 0.35 | 6.3% |
| 10 | 0.175 | 0.35 | 25.0% |
| 5 | 0.087 | 0.35 | 56.5% |
| 2.5 | 0.044 | 0.35 | 76.4% |
| 1.5 | 0.026 | 0.35 | 85.7% |
| 1 | 0.017 | 0.35 | 90.5% |
| 0.625 | 0.011 | 0.35 | 93.8% |

TABLE 1-continued

Efficiency vs. Angle limited by fringing field effects

| Angle (deg) | Angle (rad) | Index change | Efficiency |
| --- | --- | --- | --- |
| 0.25 | 0.004 | 0.35 | 97.7% |
| 0.15 | 0.003 | 0.35 | 98.3% |
| 0.1 | 0.002 | 0.35 | 98.9% |

Table 1 shows that efficiency drops off very fast for convential modulo 2π beam steering. If high efficiency is desired, then the steering angles used for sawtooth phase profile steering must be limited to very small angles. A quarter of a degree angular steering achieves about 98% steering efficiency. One degree steering results in 90% efficiency. If a 1 degree steering in both azmuith and elevation is needed, then that loss must be squared. If we use reflective beam steering, light goes into the device, bounces off a reflecting surface, and returns. As a result, the device layer is half as thick, and the fly-back region is half as wide, thus increasing the steering efficiency. If the index change due to applying an electric field is less than the assumed 0.35 in Table 1, then the steering angle for a given efficiency will be lower.

One major benefit of optical phased array non-mechanical beam steering is the ability to point very accurately. For many applications, this is very important. Modulo 2π beam steering using optical phased array, OPA, technology can enable very precise steering. This method of very precise steering is explained in Burrell R. Hatcher, "Granularity of beam positions in digital phased arrays," Proceedings of the IEEE (Volume: 56, Issue: 11, November 1968.

Another factor is the steering efficiency due to quantization, which is addressed in the following equation from the 1996 review paper by McManamon et al:

$$\eta = \left[\frac{\sin\left(\frac{\pi}{q}\right)}{\left(\frac{\pi}{q}\right)}\right]^2$$

Eight (8) steps result in 95% steering efficiency from quantization, and ten (10) steps result in 96.8%. Any loss is additional loss compared to loss from fringing fields. Actual loss due to quantization will be as shown in table 2;

TABLE 2

Quantization loss.

| No of steps | Efficiency |
| --- | --- |
| 8 | 95% |
| 10 | 96.8% |
| 12 | 97.7% |
| 16 | 98.7% |
| 20 | 99.2% |

Another background issue is the effect of magnification. A beam deflector having a small beam passing through it, when magnified, will decrease the steering angle, as shown in the following equation:

$$\vartheta_f = \frac{\vartheta_i}{M}$$

In the above equation, $\vartheta_f$ is the final steering angle, M is the magnification, and $\vartheta_i$ is the initial steering angle. For example, a 5 mm wide beam passing through a crystal and magnified to a 100 mm wide beam requires a magnification factor of 20. Therefore, a 10-degree steering angle is reduced to a half of a degree for this example.

Typical prior art bulk beam steering is depicted in FIG. 3. In bulk beam steering, light passes through an EO crystal, and is steered. Under current practice, incident light with linear polarization in the proper direction is deflected and the angle of steering is varied by the application of an electric field. The angle of deflection for the conventional bulk beam deflector is calculated as:

$$\theta_f = \frac{L\Delta n}{W}$$

Where $\theta_f$ is the deflection angle, $\Delta n$ is the index change occurred by the applied voltage and L and W are length and width of the rectangular beam deflector.

Under current practice, when the optical beam is larger than a crystal, the beam is focused into the crystal and is expanded afterward. That requires large magnification, which reduces the effective steering angle as discussed above.

Under current practice, two-dimensional beam steering can be done by two bulk crystals and a half waveplate between, as seen in FIG. 4. In addition to the necessity of a half wave plate to rotate the polarization direction of the incident light by 90 degrees, some lenses may also be required between the two crystals to have the beam go through the second crystal.

As seen in FIG. 4, one dimension will be steered first, possibly in one crystal, and then the other dimension will be steered, possibly in a second crystal. The linearly polarized light deflected in one-dimension travels through the second crystal to be steered in another dimension after its polarization direction is rotated by the half wave plate. Therefore, when the beam exits the first crystal it is defected to a certain angle. That beam direction is maintained in the second crystal. A difficulty with this geometry is that the deflection angle must be kept small, or the beam will hit the side wall of the second crystal. The deflection of the beam inside of a crystal, resulting in the possibility of hitting the wall, is often called beam walk off by those practiced in the art. The beam being steered in the second crystal can be larger without hitting the wall because the distance travelled in a crystal after beam deflection is less, and therefore there is less beam walk off. By optimizing the electrode pattern of the bulk crystal, more transmissivity, more beam displacement and therefore wider deflection angle per applied voltage can be possible.

SUMMARY OF THE DISCLOSURE

There are two thin crystal steering approaches taught, where in this case a thin crystal will be from micron level thickness to many tens of microns thick. In general, the thin crystal beam steering approaches taught will use resets to limit the thickness of the crystal layer. One of these approaches will make use of insulators between electrodes, and the other will make use of tilted electrodes, which in one embodiment can be used in conjunction with insulators. In the case of having tilted electrodes, the insulators between the electrodes don't have to be all the way through the crystal layer. In the case of flat electrodes, deeper insulators, still not necessarily all the way through the crystal, are required to reach a high beam steering efficiency. Either both or one of those two approaches can be applied to make the beam steering efficiency higher for a given thin film thickness, or to allow a thicker thin film for a given steering efficiency.

This disclosure also teaches bulk crystal beam steering to steer a larger beam, for 2-dimensional beam steering, and to steer to a wider angle with high efficiency. In general, these approaches will not require use of a reset. These bulk crystals will usually be 1-10 millimeters thick, but could be thicker or thinner.

One bulk steering approach is to have uniform electrodes on the top and bottom of a crystal, with light passing though the crystal at an angle. This approach may allow steering a larger optical beam, and only requires a single voltage to steer in one direction. The position of the beam is moved as it traverses the crystal, and optical elements are used to convert that change in position to a change in angle.

There is a method of electrode placement for steering in both azimuth and elevation in the same portion of a crystal. This will allow shortening the total required bulk crystal length, thus reducing beam walk off and wall hitting.

A method of beam steering using the Pockels effect where a single crystal can be poled in one direction, but can be used to steer in both dimensions, by placing an appropriate phase retarder between portions of the crystal.

Another embodiment comprises steering a portion of the final steering angle in each direction, and then steering a portion of the steering angle in the second direction. If the steering angles for both directions are kept small initially then there will be less wall hitting.

Bulk non-mechanical beam steering, can comprise using continuous, or discrete, triangular conductive electrodes which are narrower at the inlet side of the crystal and are larger at the outlet side. The steering angle per applied voltage is larger compared to the common practice, resulting in a larger steering angle for a given applied voltage. If the beam is small it is initially on axis, and then is steered off axis. The steering angle is larger if a certain voltage is spread across a smaller distance, so using electrodes of varying width can provide larger angle steering for the same applied voltages.

In bulk non-mechanical beam steering, a single resistive electrode with increasing width may be used. The resistor electrodes are employed in various configurations, where the voltage across a given region on the surface of a crystal varies linearly based on voltage drop across a resistive electrode place on one or more sides of a crystal.

Another embodiment of the present disclosure comprises a butterfly structure for steering to a wider angle. This embodiment takes advantage of wall hitting to steer to a wider angle. The beam hits the wall and reflects inside the crystal and crosses the crystal three times and ends up deflecting to a wider angle.

DETAILED DESCRIPTION

Figure 1:
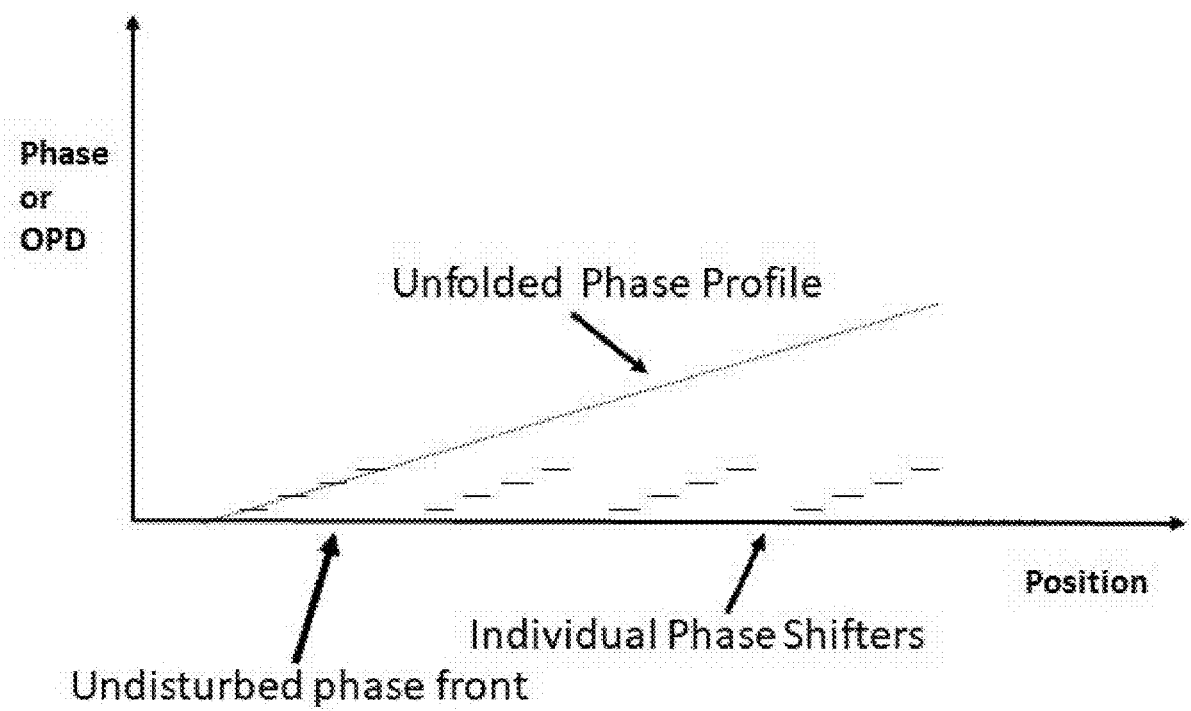
FIG. 1 shows a graph depicting modulo $2\pi$ phase shifting to create beam steering.
Figure 2:
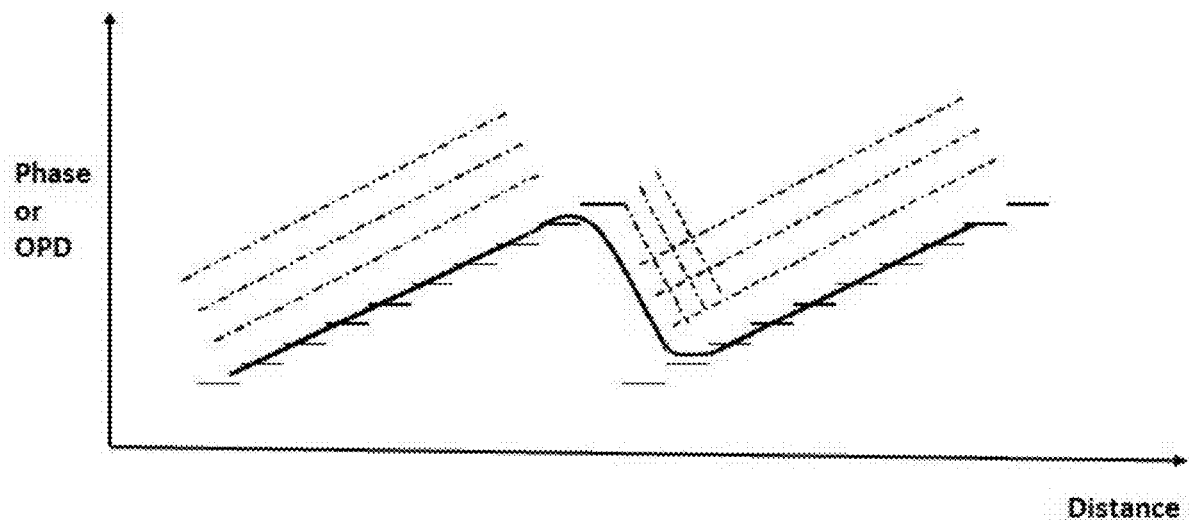
FIG. 2 shows a graph depicting the effect of fringing fields on phase profile.
Figure 3:
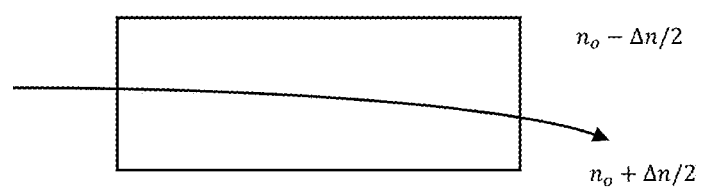
FIG. 3 is a plan view of prior art conventional bulk beam steering.
Figure 4:
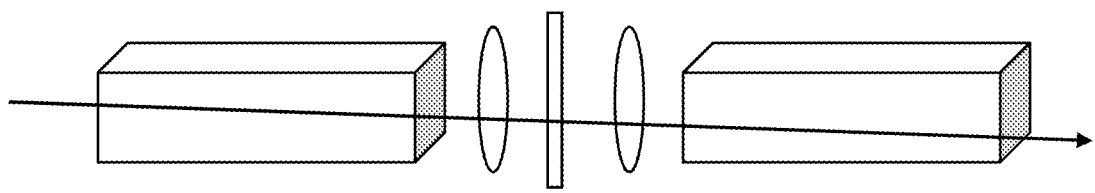
FIG. 4 is a plan view of prior art conventional 2-dimension bulk beam steering.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

MORE DETAILED DESCRIPTIONS OF THE EMBODIMENTS

Figure 5:
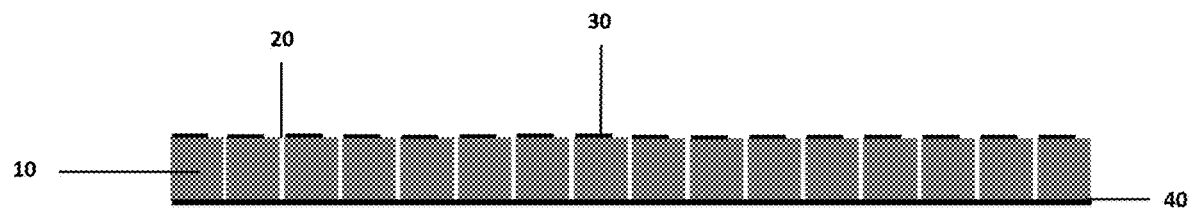
FIG. 5 is a plan view of an embodiment comprising insulators to reduce fringing field effects.

Referring to FIG. 5, an embodiment of this disclosure comprises a set of transparent discrete electrodes 30 and a ground electrode 40 located on opposite sides of an electro-optical ("EO") crystal layer 10. Discrete electrodes 30 could replace the uniform ground electrode 40 in some embodiments. Light is propagating perpendicular to the EO crystal layer 10, or at some angle with respect to the ground electrode 40, through the EO crystal layer 10, toward the discrete electrodes.

Note, the terms "crystal," "EO crystal," "crystal layer" and "EO crystal layer" are used interchangeably herein and refer to any media who's index of refraction or birefringence can be changed by the application of an electric field. The crystals of this disclosure may include crystals with either a linear, or quadratic, change in index of refraction with respect to an applied field. The term crystals may also include liquid crystals. If transparent electrodes are used on both side of the structure shown in FIG. 5, then in order to achieve larger steering angles one embodiment could use multiple stacked structures as shown in FIG. 5.

Ground electrode 40 includes, but is not limited to transparent ground electrodes. The transparent ground electrode 40 may be a single electrode as shown, or may be a series of electrodes similar to discrete electrodes 30 located on the other side of the EO crystal layer 10. If the ground electrode 40 is a series of electrodes, said series of electrodes 40 do not have to all be set at zero voltage, even though the term ground is used.

The use of insulators 20 between electrodes 30 reduces the fly-back discussed in the background section for modulo 2πc beam steering devices. This will allow steering to larger angles at high efficiency, because it will reduce the fringing field effects on the electric field. Normally, there would be significant spreading of the electric field, referred to as fringing fields, but because of the insulator 20 between electrodes 30, this spreading of the electric field will be reduced.

In one embodiment, the crystal layer 10 may have a resistivity that may be as much lower than the insulator 20, for example 100 times lower. This is estimated to reduce the fringing electric field spreading effect by for example a factor of approximately 100 times in the insulator 20. The width of the insulator 20 can influence the amount of fringing field reduction. The quality of the insulator may also influence the amount of fringing field reduction, with a less conductive insulator providing more reduction in fringing fields. The insulator 20 may extend completely through the crystal layer 10 whose index can be changed by an electric field or the insulator 20 may only extend part way through the crystal layer 10. For example, the insulator 20 may extend anywhere from less than 10% to more than 80% through the crystal layer 10, or it can extend 100% of the way through the crystal. As a result, sharper resets are realized when the OPD is reduced during a reset from approximately a multiple of one wave, or a multiple of one wavelength, to approximately zero. Consequently, an OPD profile with sharper resets results, and therefore higher steering efficiency is realized.

Figure 6:
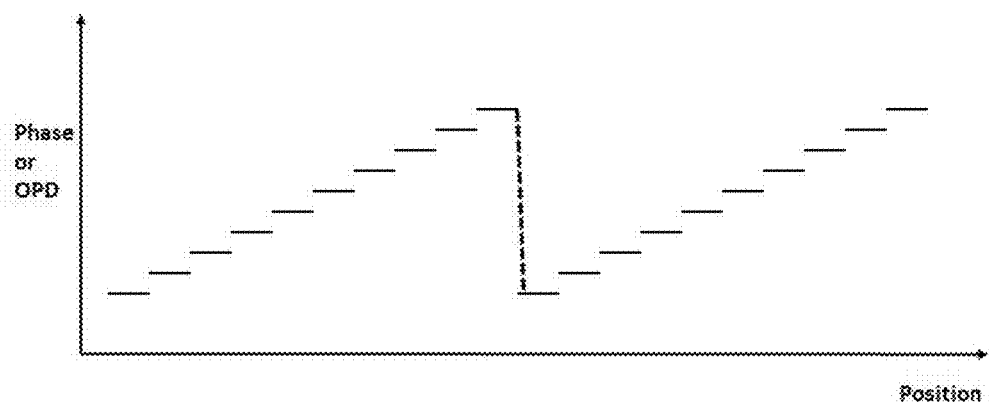
FIG. 6 is a graph depicting step increments in phase and a sharp reset associated with the FIG. 5 embodiment.

As seen in FIG. 6, the electric field will increase in more discrete step increments than without the insulator 20 separating the discrete electrodes 30, rather than being smoothed by fringing fields, and the resets will be much sharper. One reason only partial penetration of the crystal layer 10 by the insulators 20 might be used would be to retain some smoothing of the fringing fields on the increasing phase ramp. A second reason might be practical considerations in creating the insulators within the crystal layer 10.

Figure 7:
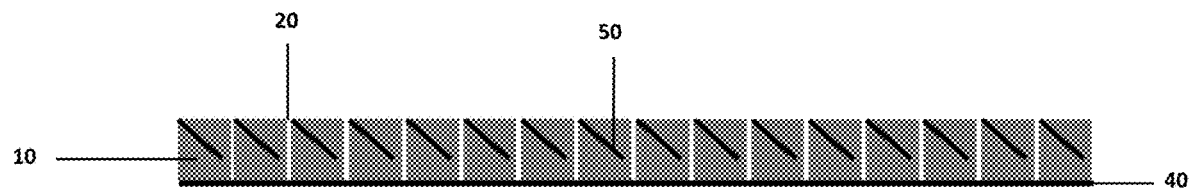
FIG. 7 is a plan view of an embodiment comprising tilted electrodes and insulators to reduce fringing field effects.

Referring to FIG. 7, another embodiment of this disclosure comprises tilted electrodes 50 instead of electrodes on the surface of the EO crystal layer 10. This embodiment will reduce, or eliminate, the quantization effect of the steps in building up the electric field. This embodiment further comprises an EO crystal layer 10, a ground electrode 40 and insulators 20. Ground electrode 40 includes, but is not limited to transparent ground electrodes. The transparent ground electrode 40 may be a single electrode as shown, or may be a series of electrodes. Once again, insulators 20 may extend fully or partially through EO crystal layer 10.

Figure 8:
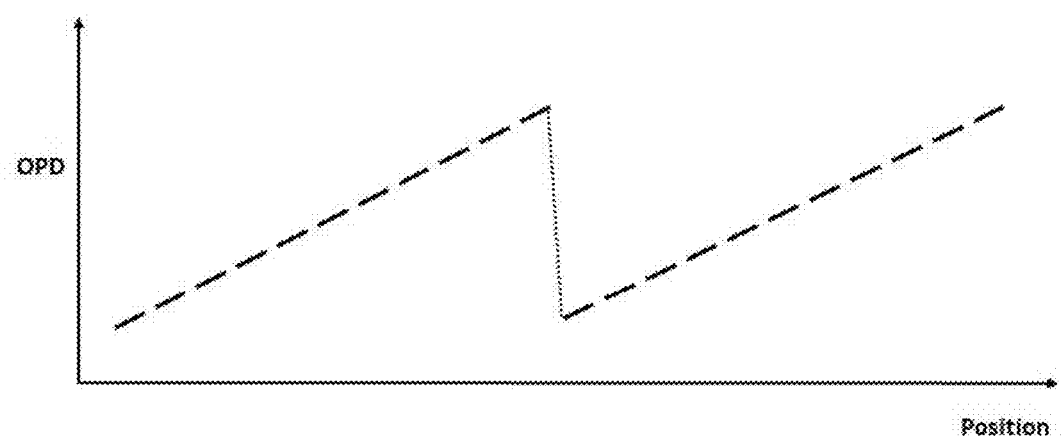
FIG. 8 is a graph depicting sharper reset provided by the embodiment of FIG. 7.

For the tilted electrode embodiment shown in FIG. 7, the electric field on adjacent discrete tilted electrodes 50 is made continuous, or near continuous, by reducing the distance between the discrete electrodes 50 and the ground electrodes 40 using a fixed tilt angle. While the fixed electrode tilt angle may not be ideal for all steering angles, it will reduce the quantization effect over a wide range of steering angles. As shown in FIG. 8, an increase in applied voltage is compensated by the distance change to provide a continuous, or near continuous, electric field at any adjacent discrete tilted electrode 50 before reset.

Another embodiment (not shown) using the insulators would be to implement modulo $2\pi$ beam steering using liquid crystals to cause a change in index of refraction. Any material that can have an index of refraction change in one polarization could be used with the insulators between tilted or flat electrodes. The insulators can also be located between the electrodes with a depth between zero to the liquid crystal thickness depending on the desired steering efficiency.

Figure 9:
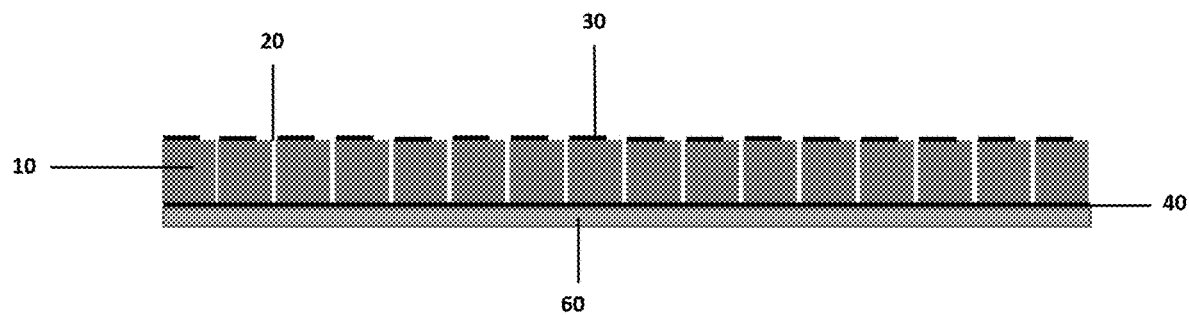
FIG. 9 is a plan view of the FIG. 5 embodiment with the addition of a mirror layer.
Figure 10:
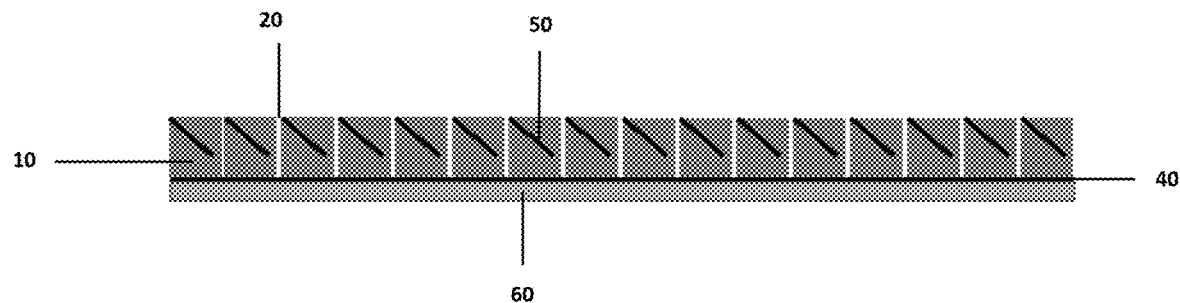
FIG. 10 is a plan view of the FIG. 7 embodiment with the addition of a mirror layer.

As seen in FIG. 9 and FIG. 10, a mirror layer 60 can be added after the ground electrode layer 40. If a stack of structures is used the mirror layer would be after the full stack of device layers. This will increase the deflection angle allowed at a certain steering efficiency by reducing the required cell thickness, and the fly-back region distance.

Another embodiment of the present disclosure includes the use of bulk crystal materials, possibly in a true time delay implementation. A true time delay implementation of optical phased arrays means no resets are required. These bulk crystals do not necessarily need resets because the OPD can change by many orders of magnitude more than one wavelength. Therefore, steering up to a particular angle can be accomplished without using resets.

Figure 11:
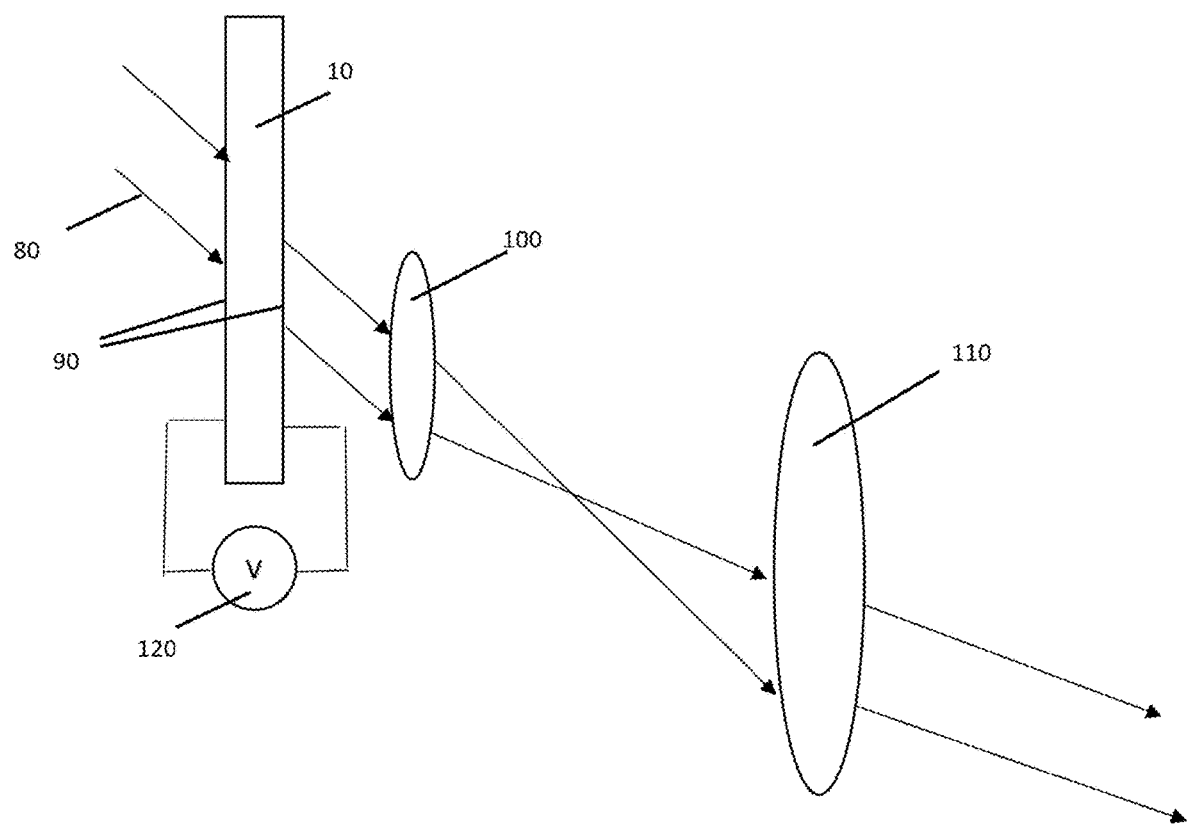
FIG. 11 is a plan view of an embodiment of a bulk deflector for wide aperture beams.

Referring now to FIG. 11, the first bulk crystal beam steering embodiment is shown and includes a bulk EO crystal slab 70 that can steer a bigger aperture beam continuously and may use lower voltage compared to current practice, to steer to a certain angle. The deflection angle will be small but it is unlikely wall hitting can occur because the beam is only displaced, not deflected, in the bulk EO crystal slab 70. The beam 80 enters and leaves the bulk EO crystal slab 70 at the same angle, but displaced in position. In this embodiment, it is possible a lower voltage can be used for beam steering. In current practice, the beam diameter must be small to prevent the use of a very high voltage. This is important because high voltage use is either costly, or can require a large and heavy power supply. Unlike current practices, where limitations on the maximum applied voltage require the optical beam diameter to be small, in this new bulk crystal beam deflector, there is no limitation on the aperture size because of the voltage required to impose a transverse electric field.

In FIG. 11, EO bulk crystal 70 is equipped with two transparent electrodes 90. The transparent electrodes 90 are located on opposing sides of EO bulk crystal 70. The beam steering apparatus shown in FIG. 11 further comprises a first lens 100 with focal length of $f_1$ and a second lens 110 with focal length of $f_2$. Second lens 110 is located at $f_1+f_2$ from the first lens 100. The beam steering device also comprises a voltage supplier 120.

The refractive index of the EO crystal slab 70, or any other material whose index of refraction can be changed by the application of an electric field, is changed by varying the applied voltage on the transparent electrodes 90 attached to both sides of the EO bulk crystal slab 70. The linearly polarized beam 80 which incidents on the EO bulk crystal slab 70 by a fixed angle exits the EO bulk crystal slab 70 with a same angle but its position will be altered by changing the index of the EO bulk crystal slab 70 as a result of varying the applied voltage. That position change is converted to a change in angle by the first lens 100. Because the beam 80 is converged by the first lens 100, a second lens 110 is necessary to re-collimate the beam 80. Thus, the combination of the first lens and second lens essentially form a telescope. Any form of telescope is suitable for this application, not just the form shown in FIG. 11. Optionally, a mirror 130 is located after the second lens 110. The deflection angle addressed by this bulk system can be approximately calculated using the following equation:

$$\Delta\theta_{def} = \frac{\theta d}{f1}\left(\frac{\Delta n}{n^2}\right)$$

Where $\theta$ is the incident angle, d is the EO crystal slab thickness, f1 is focal length of the first lens and n is the refractive index of the EO slab.

Figure 12:
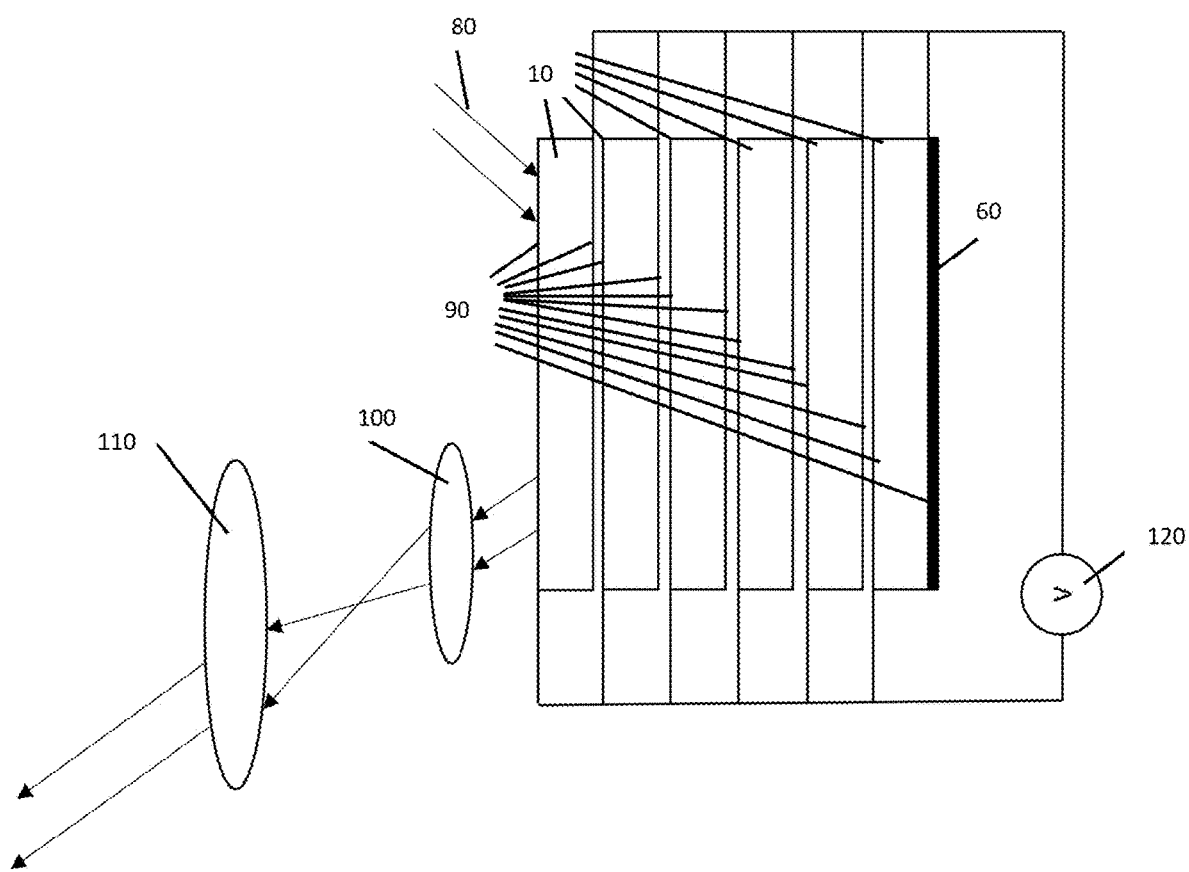
FIG. 12 is a plan view of an embodiment of a slab array method to steer large aperture beam to a wider angle using a lower voltage.

Referring now to FIG. 12, the deflection angle in the slab method can be increased without having a thicker crystal or increasing the applied voltage, by having more slabs in series, and/or making the last surface of the last slab reflective. Having several slabs 10 in series and making the last surface reflective 60 will make the optical beam travel through more EO crystals and will result in a higher position change, and therefore a higher deflection angle, without having to apply a higher voltage. The two sides of each slab 10, except the right side of the last slab, is covered by uniform transparent electrodes 90. The beam is reflected by the reflective layer 60 and goes all the way through the EO crystal slabs 10 again to get a larger position change. The larger position change will result in a wider deflection angle. An optional final reflector could be added to FIG. 12 so the exiting light is going the same direction as the entering light, except for the deflection angle.

Figure 13:
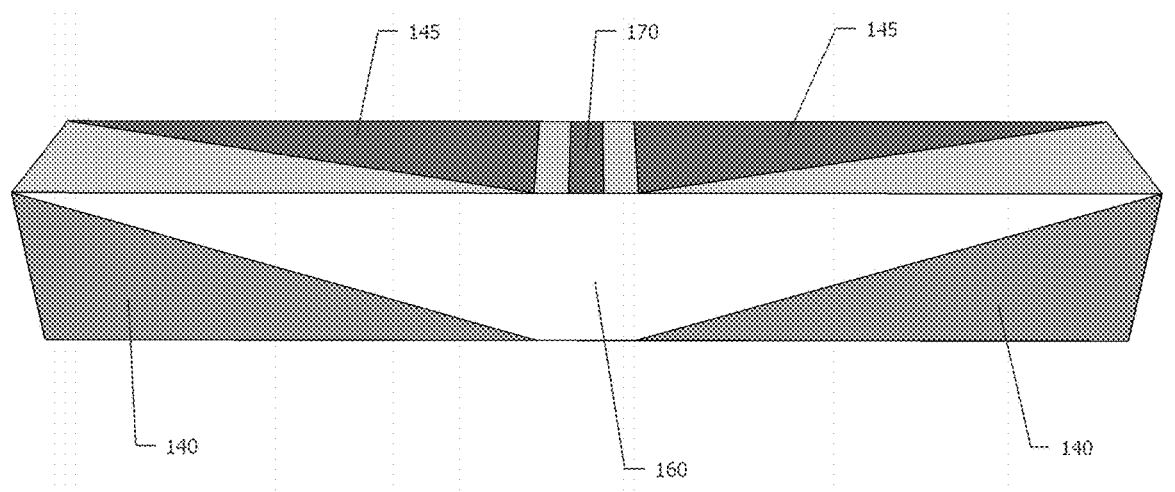
FIGS. 13(a) and (b) are a plan view of an embodiment of Bulk 2-d beam steering for cubic phased EO crystals.
Figure 13:
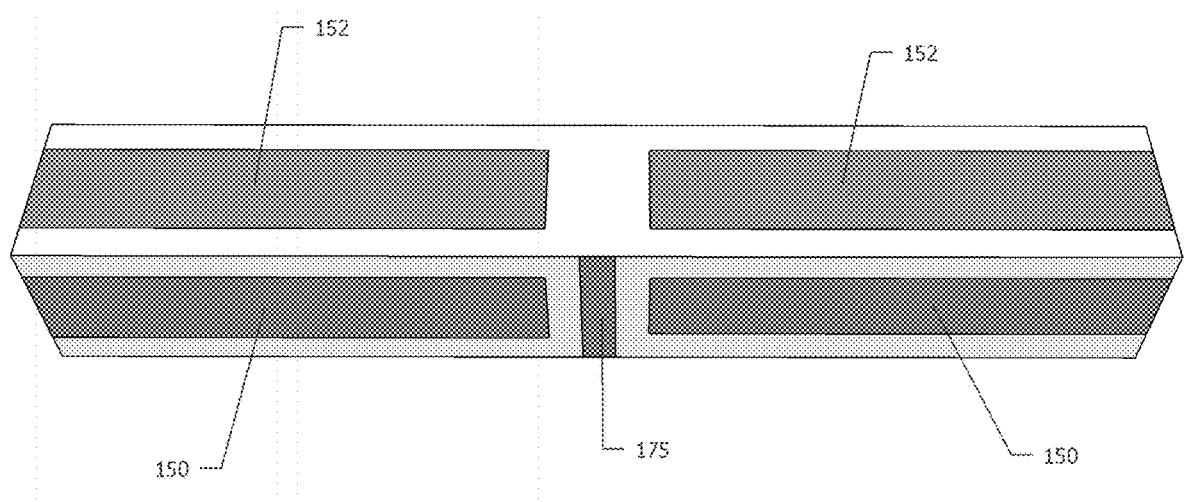

The embodiment shown in FIG. 13 will be for steering light using Kerr effect based EO crystals. This is referred to as bulk beam steering because the beam steering occurs in a bulk material, not a thin material. Moreover, bulk beam steering does not require any resets. It may require a small beam however because if the beam is large it would require a large crystal, and if the crystal is large across the dimension voltage is applied, then it will require high voltage. To create steering using either the linear or the quadratic electro-optical effects requires a high electric field. Voltage is high if a high electric field across a large distance is required. In this embodiment, there are patterned electrodes on two sides of a Kerr effect crystal 160. A rectangular shaped electrode 150, 152 is arranged on the opposite sides of the Kerr effect crystal 160 from each patterned/triangular shaped electrode 140, 145. The rectangular electrode 150, 152 is kept away from the long side edges of the crystal to prevent arcing. This rectangular electrode 150, 152 can be used as a ground plane, but can be kept at any voltage.

As FIG. 13a and FIG. 13b discloses, there are at least four triangular electrodes, two top conductive electrodes 145 and two side conductive electrodes 140. This embodiment also includes at least four rectangular electrodes, which comprise two ground electrodes 150, which may be located on the bottom of the EO bulk crystal 160, and two side ground electrodes 152, which are located on a second side of the EO bulk crystal 160, which is opposite a first side of the crystal where the side conductive electrodes 140 are located. In addition, a top polarizer conductive electrode 170 is located on the top of the EO bulk crystal 160 and is arranged between the two triangular top conductive electrodes 145. A second rectangular polarizer electrode 175 is arranged on the bottom of the EO bulk crystal. In this particular embodiment, the second polarizer electrode 175 is arranged between the rectangular ground electrodes 150. These shapes, positioned as they are in FIG. 13a and FIG. 13b, allow placing fields across an EO crystal 160 in 2 dimensions at the same time without causing arcing due to adjacent electrodes. Because this is a Kerr effect crystal in a cubic phase region, polling of ferroelectric domains is not a limitation, and electrodes can be located on two sides of a single crystal 160. This allows a beam to be steered in both dimensions using the same section of the EO crystal 160 after rotating the light polarization by applying a correct DC voltage on the polarizer electrodes 170, 175 of the EO crystal 160.

Current practice for true time delay steering in a crystal would be to steer one dimension, then steer the second dimension, as described in the background section. The current practice requires twice the length of crystal material, and therefore steering angles will be much more limited before beam walk off results in the beam hitting the wall. As an alternative to the current practice, the second EO crystal can be made larger, but large EO crystals require higher voltage to create the same electric field inside of the crystal, thus increasing the size and weight of a required power supply.

Opposite the triangular electrodes 140, 145 are rectangular electrodes 150, 152 that can be used as a ground plane. This implies no loss of generality. Any voltage can be placed on the uniform electrodes. A fixed DC voltage is applied to the polarizer electrodes 170, 175 because polarizer electrodes 170, 175 act like a half wave plate. While FIG. 13 shows both sections of the crystal as the same length. Each section can be any length. The FIG. 13 is just for illustrative purposes of one possible implementation. In addition. the amount of angular beam steering does not have to be the same in each direction.

As explained in the background section, at the current time Pockels effect based steering using EO crystals will require two discrete crystals with a half wave plate between them. In contrast, FIG. 14 discloses an embodiment comprising a single EO crystal 200 in an appropriate crystal class such as 4 mm or 3 m, with the electric field in a single direction, to do beam steering in both dimensions, rather than using 2 crystals. The embodiment further includes EO crystal 200 having a top 202, an opposing bottom 204, a first side extending perpendicularly between the top 202 and bottom 204 and a second side arranged opposite the first side 206. A pair of conductive electrodes 210 are arranged on the top 202. Located between the conductive electrodes 210 is a conductive polarizer electrode 220. A second pair of conductive electrodes 215 are arranged on the bottom 204. A second conductive polarizer electrode 225 is located between the second pair of conductive electrodes 215.

The EO crystal 200 can include any appropriate type of crystal as would be understood by one of ordinary skill, including, but not limited to ferroelectric crystals, especially in the class of 4 mm and 3 m. When a Kerr effect is involved, a ceramic instead of a single crystal may be used. The electrode pattern shown on the bottom of the EO crystal 200 is similar to the electrode pattern on the top shown in FIG. 14. A correct fixed DC voltage is applied on polarizer electrode 220 but any voltage can be applied to electrodes 210, 215. Because the electric field is applied in one direction, the deflection angle in one dimension will be smaller than the other dimension. That can be slightly compensated by increasing the length and/or the applied voltage on the electrodes responsible for steering to that dimension.

Figure 14:
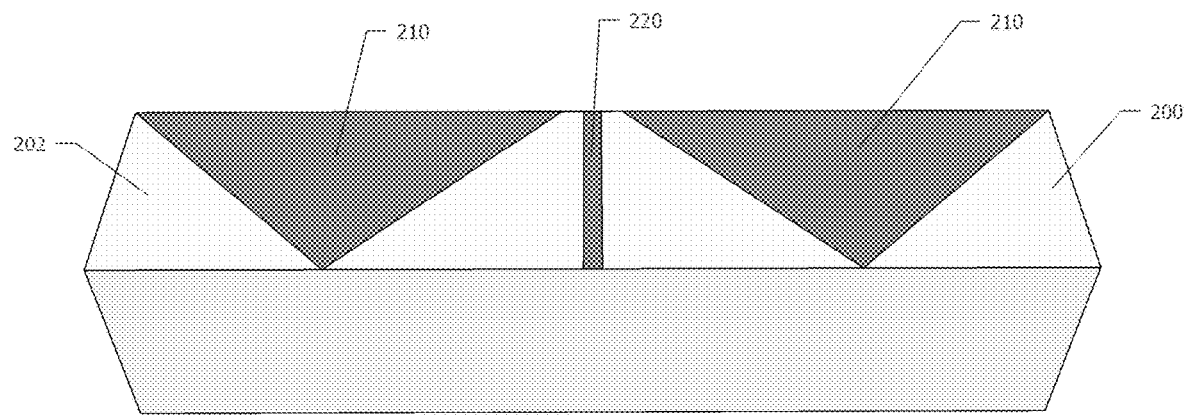
FIGS. 14(a) and (b) are a plan view of an embodiment of a beam steering electrode pattern for EO crystals in crystal classes 4 mm or 3 m.
Figure 14:
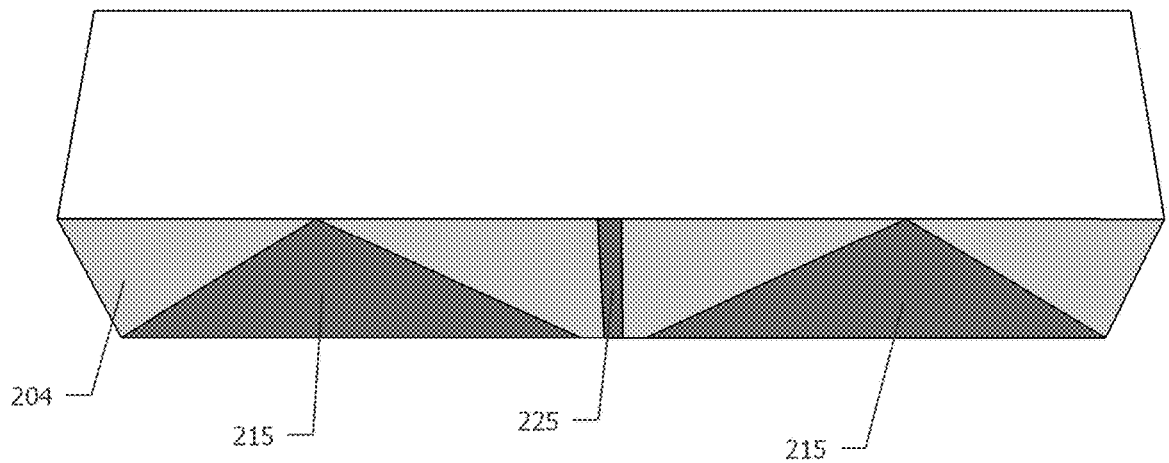

A benefit of the FIG. 14 embodiment is to allow beam steering for either Kerr effect or Pockels effect crystals while only using a single crystal, polled in only a single direction. Polarization is rotated between sections of the EO crystal 200. Because of the properties of the EO crystal 200, rotating the polarization causes the beam to steer in a different dimension.

The current state of the art teaches, Pockels effect based steering using EO crystals that require two discrete crystals with a half wave plate between. In contrast, the embodiment shown in FIG. 15 comprises a single EO crystal 230 to do beam steering to wider angles in both dimensions in a compact structure. In this embodiment, rather than a uniform bottom electrode, the opposite electrodes are in the same pattern as the top electrodes.

Referring to FIGS. 15a and 15b, EO crystal 230 comprises at least one top conductive electrode 240 arranged along the top 232 of the EO crystal 230. The embodiment shown in FIG. 15a depicts top conductive electrode 240 as triangular in shape. A rectangular shaped conductive polarizer electrode 260 is also arranged on the top 232. A first side conductive electrode 245 is arranged on a first side 234. Conductive electrode 245 may also be triangular in shape. Referring to FIG. 15b, a bottom conductive electrode 250 and a bottom conductive polarizer electrode 265 are located on a bottom 236 of EO crystal 230. The bottom conductive electrode 250 and bottom conductive polarizer electrode 265 are arranged directly opposite the top conductive electrode 240 and top conductive polarizer electrode 260, respectively. A second side conductive electrode 255 is arranged on a second side 238 of EO crystal 230. The second side conductive electrode 255 may also be triangular is shape. Second side conductive electrode 255 may be arranged directly opposite of first side conductive electrode 245.

Figure 15:
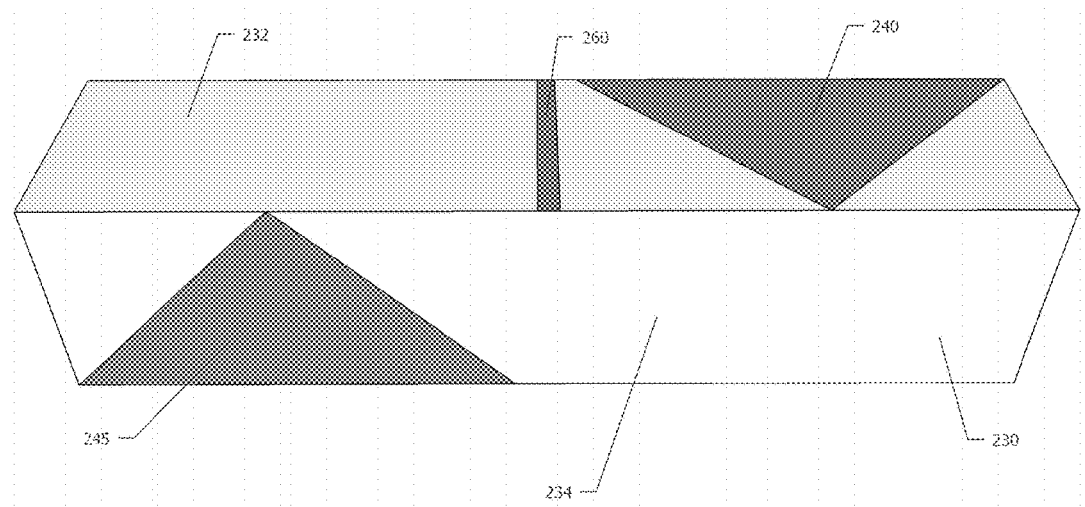
FIGS. 15(a) and (b) are a plan view of an embodiment of a beam steering electrode pattern for EO crystals.
Figure 15:
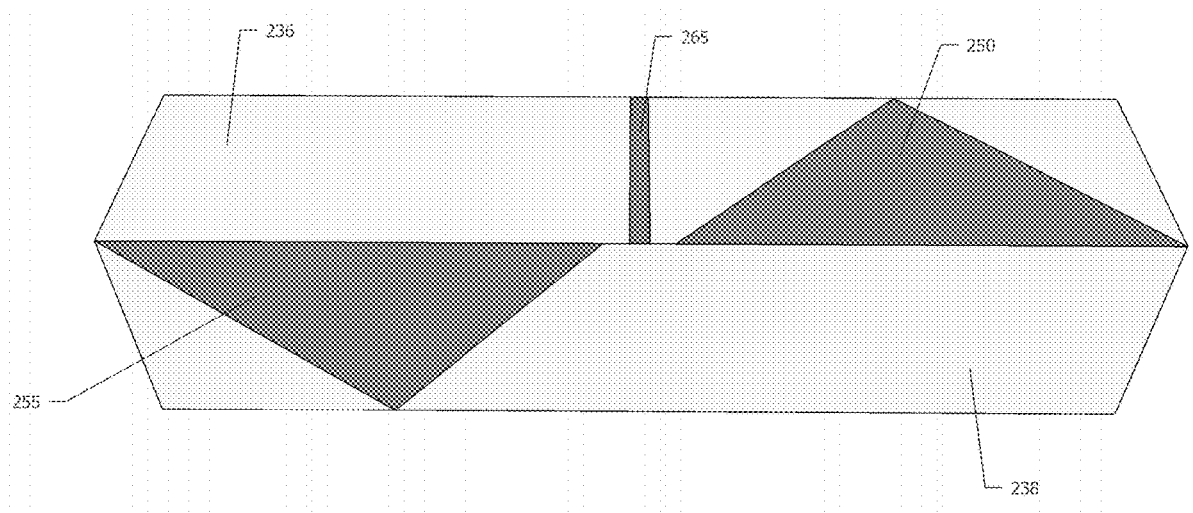
Figure 16:
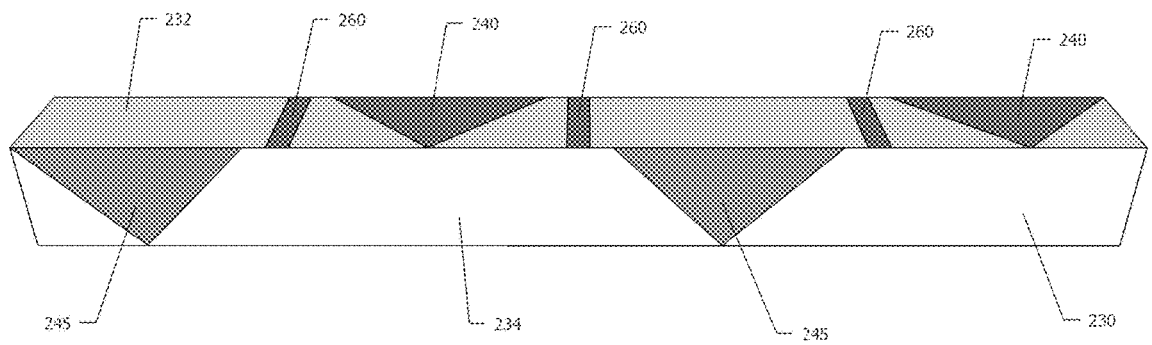
FIGS. 16(a) and (b) are a plan view of an embodiment of a beam steering electrode pattern for EO crystals for larger angles.
Figure 16:
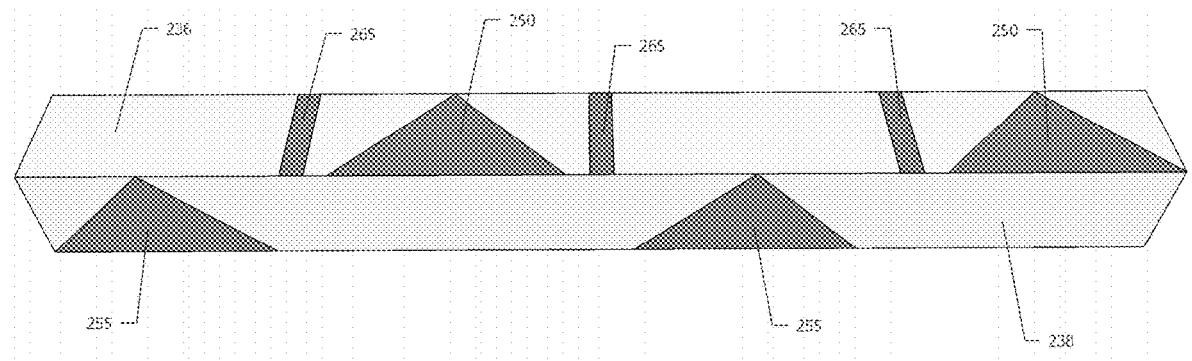

To steer to larger angles, the embodiment shown in FIG. 15 can be repeated as shown in FIG. 16. As seen in the embodiment shown in FIG. 16, unlike current practice, the beam is not completely steered to one direction and then steered to other direction in the second crystal. The beam is steered gradually in each direction and therefore the polarization of light is flipped several times by the polarizer electrodes to make the light see the index change in different directions. In other words, the first dimension steered is only steered initially to a small angle, so large angle steering does not have to traverse a long section of crystal prior to exiting the crystal. The steering to both directions is done gradually, and in multiple steps. Similarly, three voltages are supplied to this system. Two DC or AC voltages for adjusting the angles and one fixed DC for rotating the light polarization to make the light see the index change in another direction.

Figure 17:
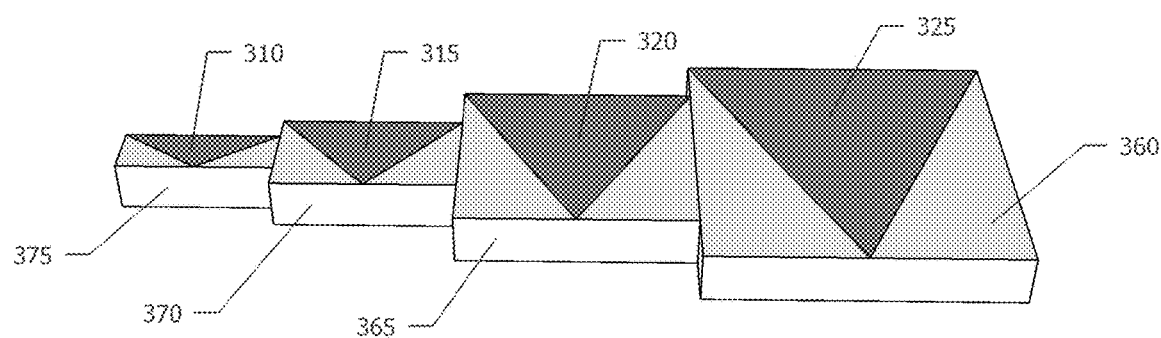
FIGS. 17(a) and (b) are a plan view of an embodiment of a multi-bulk-crystal deflector.
Figure 17:
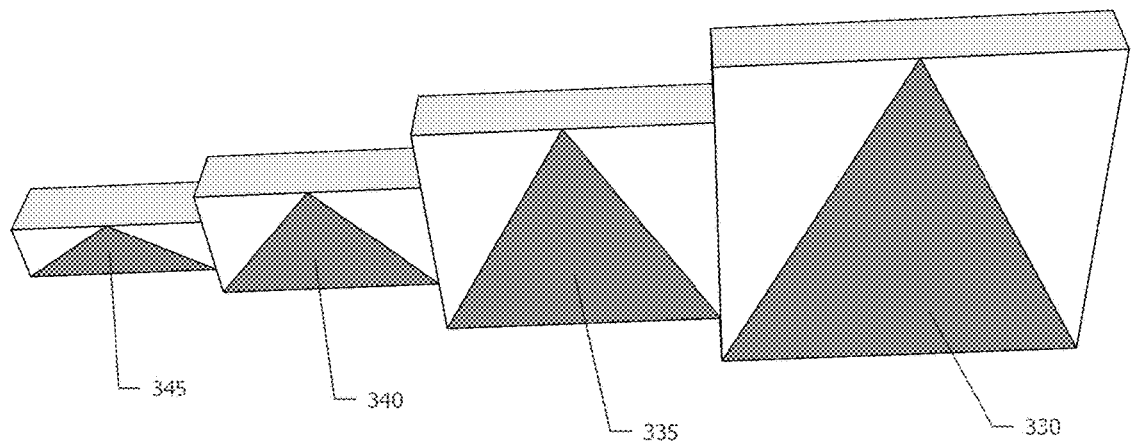

The bulk steering embodiments below will result in steering to larger angles, and more resolvable spots, than current practice. The embodiment, shown in FIGS. 17a and 17b, comprises attached bulk EO crystals 360, 365, 370, 375, which can continuously steer a linear polarized beam to a larger angle compared to current practice. Even though FIG. 17 depicts four EO crystals, one of ordinary skill would understand that the number of EO crystals in this embodiment may be as few as two or more than four. Conductive electrodes 310, 315, 320 and 325 are arranged on the top of crystals 360, 365, 370, 375, respectively. As shown in FIG. 17b, bottom conductive electrodes 330, 335, 340 and 345 are arranged on the bottom of bulk EO crystals 360, 365, 370, 375, respectively. Each of the top and bottom conductive electrodes may be triangular in shape. The number of top and bottom conductive electrodes will correspond to the number of EO crystals utilized.

As discussed above, EO crystals 360, 365, 370, 375 may include other materials whose index is modified by the application of an electric field. If $W_i$ and $L_i$ are the width and length of each bulk crystals, the optimum number of triangular electrodes may be approximately determined using the following equation:

$$N_{opt} = 0.87 \frac{L_i}{W_i}$$

For the embodiment shown in FIG. 17, the deflection angle can be calculated using the following equation:

$$\theta_f = \Delta n \sum \frac{L_i}{W_i}$$

The embodiment shown in FIG. 17 can also be implemented in one rectangular crystal, or any number of crystals placed in a series of crystals. In FIG. 17, it is shown using multiple electrodes, in multiple crystals, increasing in size as the beam may have been steered away from the center of the crystal. The crystals placed in series can be of any size.

Figure 18:
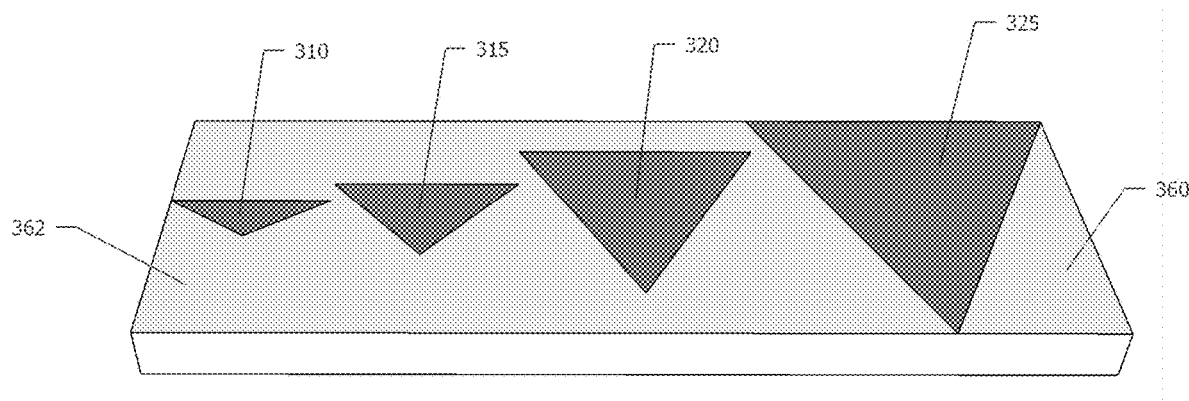
FIGS. 18(a) and (b) are a plan view of an embodiment of a single-bulk-crystal bulk deflector with discrete electrodes.
Figure 18:
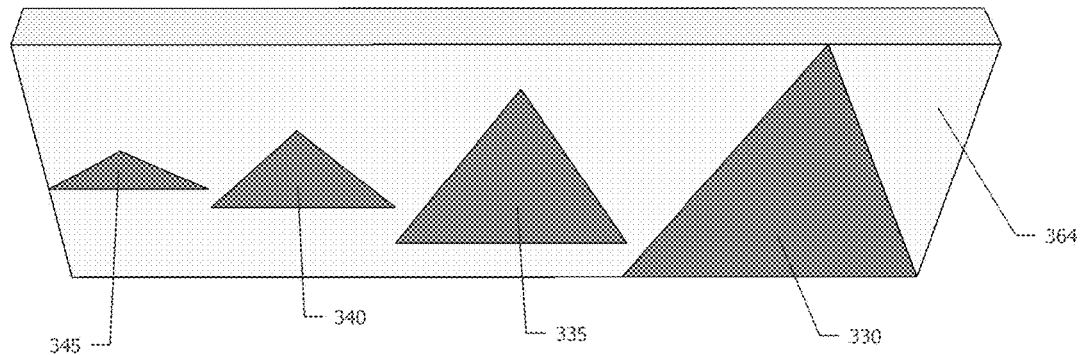

FIG. 18 shows a pattern of electrodes increasing in size, arranged on a single rectangular crystal to deflect the linear polarized beam in a manner similar to the system shown in FIG. 17. A series of triangular conductive electrodes 310, 315, 320, 325 are arranged along a top side 362 of EO crystal 360. A corresponding series of triangular conductive electrodes 330, 335, 340, 345 are arranged along a bottom side 364 of EO crystal 360.

As seen in the embodiments shown in FIGS. 17 and 18, discrete electrode patterns to steer the linearly polarized beam to a larger angle are used compared to conventional deflectors. In both FIGS. 17 and 18, the deflection angle is increased by reducing the width of the discrete triangular electrodes at the input of the crystal and gradually increase it to the width of the rectangular EO crystal.

Figure 19A:
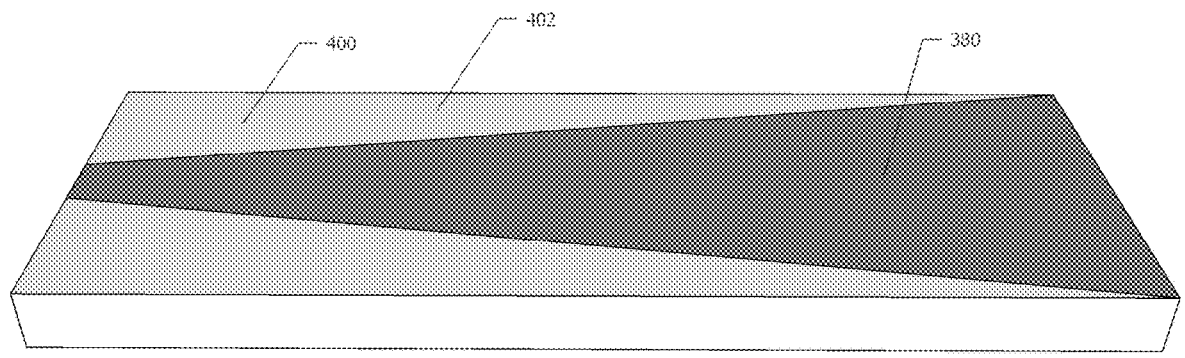
FIGS. 19(a) and (b) are a plan view of an embodiment of a single-bulk-crystal bulk deflector with a linear shaped resistor electrode.
Figure 19:
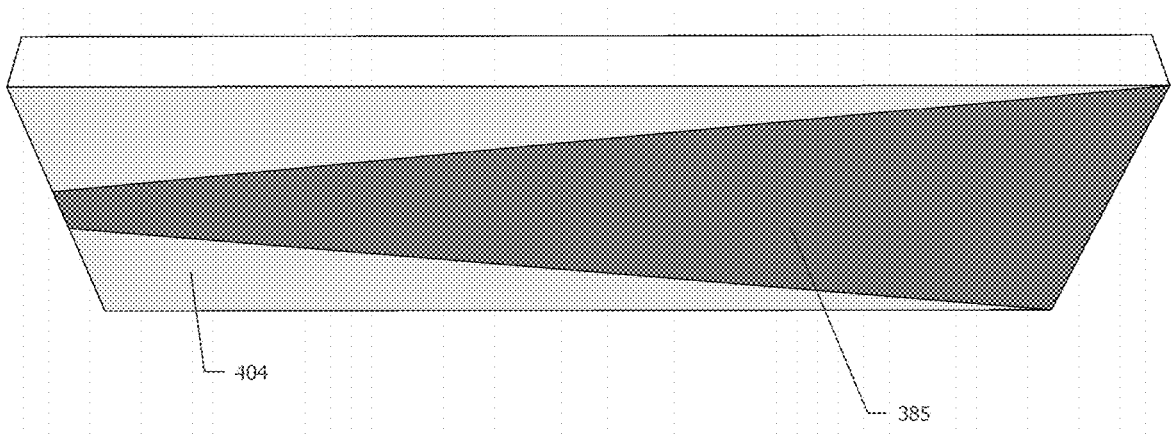
Figure 20:
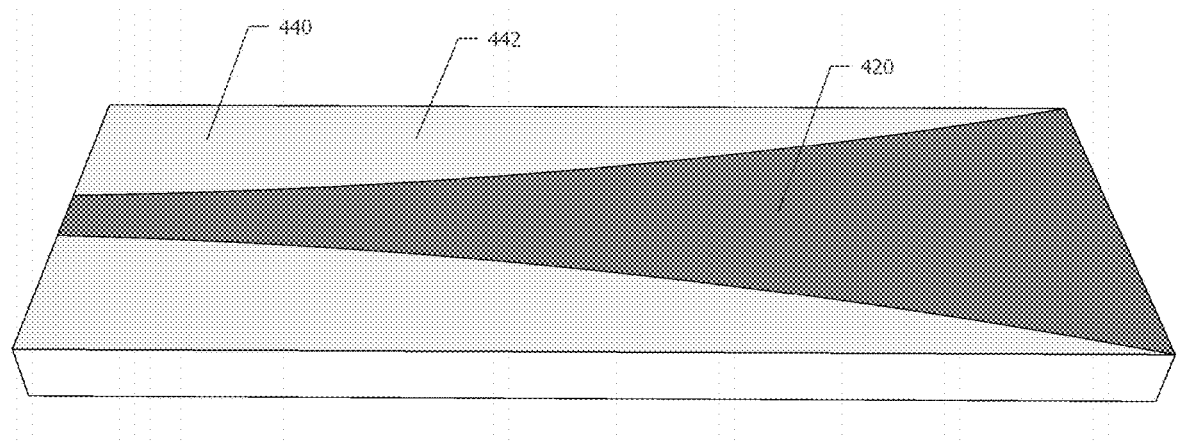
FIGS. 20(a) and (b) are a plan view of an embodiment of a single-bulk-crystal bulk deflector with a nonlinear shaped resistor electrode.
Figure 20:
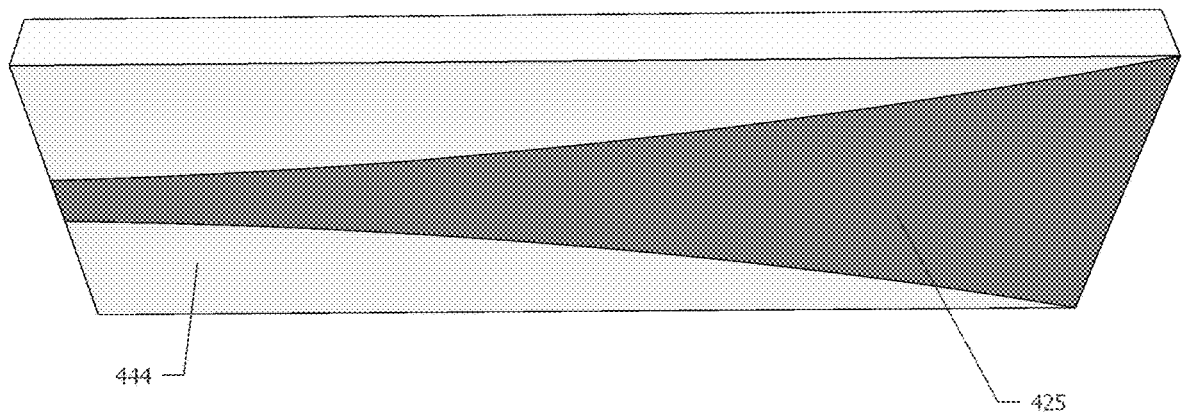

Referring to FIGS. 19 and 20, the deflection angle is increased by reducing the electrode width at the input of the crystal and gradually increase it to the width of the rectangular EO crystal. Increasing the width of the electrode can be either linear, as shown in FIG. 19 or nonlinear, as shown in FIG. 20. In FIGS. 19 and 20 the top electrode is resistive, with a voltage gradient across the electrode.

In the embodiment shown in FIGS. 19a and 19b, the electrode 380, with its linearly increasing width, is arranged on a top side 402 of bulk EO crystal 400. Electrode 380 may comprise a resistor. Bottom electrode 385, also with a linearly increasing width, is arranged on a bottom side 404 of bulk EO crystal 400. Bottom electrode 385 may also comprise a resistor.

FIG. 20 shows a nonlinear shaped electrode 420 arranged on a top side 442 of bulk EO crystal 440. Nonlinear shaped electrode 420 may comprise a resistor. A second electrode 425 is arranged on the bottom side 444 of EO Crystal 440. If L is the length of the crystal, and $W_i$ and W are respectively the inlet width and crystal width, the angle of deflection may be calculated using the following equation:

$$\theta_f = \frac{L\Delta n}{\overline{W}}$$

Where the $\overline{W}$ is logarithmic mean of $W_i$ and W.

Figure 21:
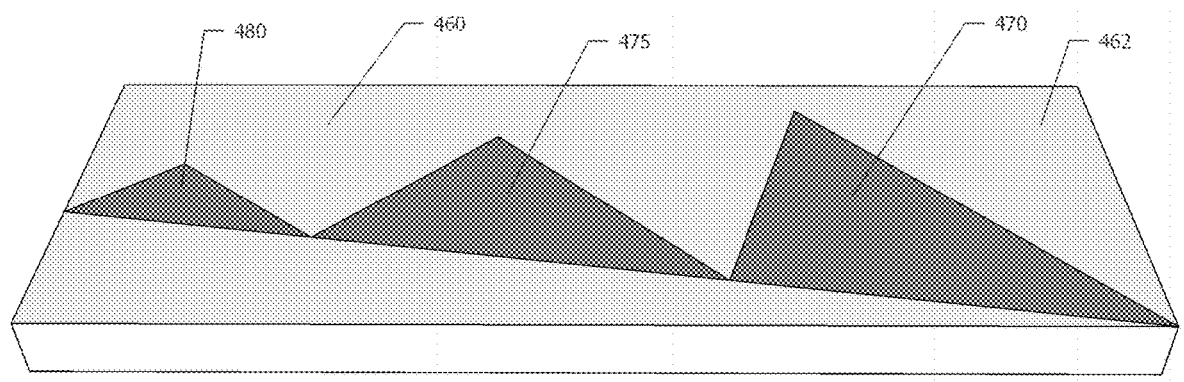
FIGS. 21(a) and (b) are a plan view of an embodiment of a single-bulk-crystal bulk deflector with non-discrete electrodes.
Figure 21:
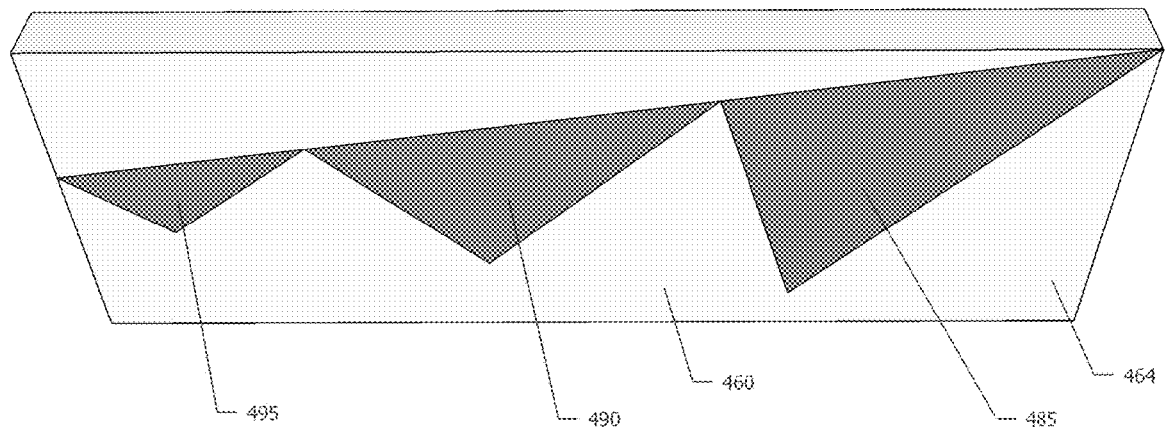

Referring now to FIG. 21, instead of using resistor electrodes, as in the embodiments shown in FIG. 19 and FIG. 20, triangular conductive (possibly silver) electrodes may be used. Specifically, EO bulk crystal 460 comprises a top 462 where a series of non-discrete conductive electrodes 470, 475, 480 are located. A second series of non-discrete conductive electrodes 485, 490, 495 are arranged on the bottom 464 of EO crystal 460. The first and second series of non-discrete conductive electrodes may comprise more or less than three electrodes. The single bulk EO crystal 460 should be polled to work in the ferroelectric region. As already mentioned, the optimum number of triangular electrodes for a rectangular EO crystal with length of L and width of W can be calculated from the following equation;

$$N_{opt} = 0.87 \frac{L}{W}$$

In embodiment shown in FIG. 18, different voltages may be applied on the triangular electrodes at one side of the crystal but the same voltage is applied on the triangular electrodes installed on one side of the embodiment shown in FIG. 21.

Figure 22A:
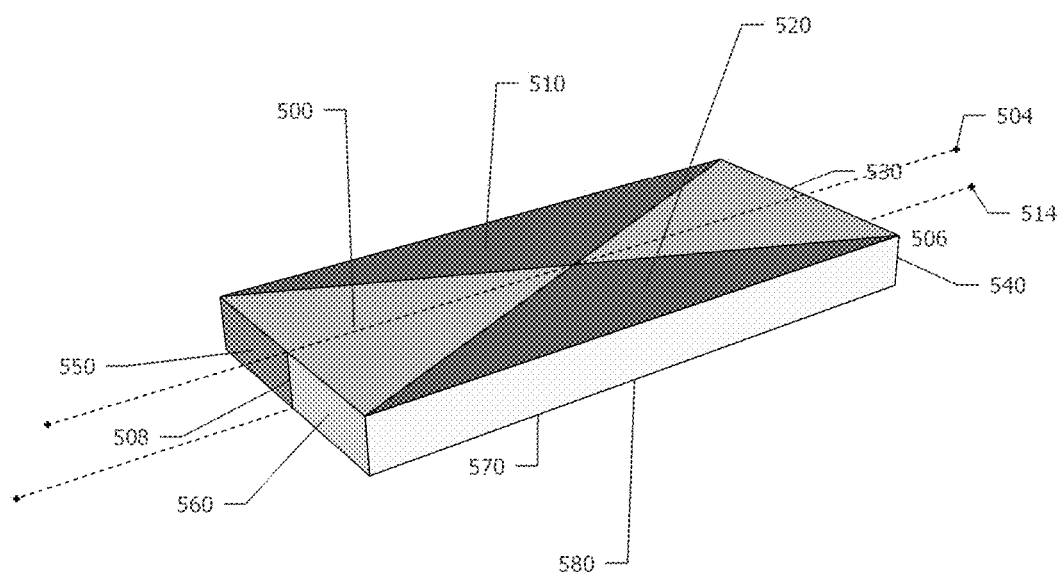
FIGS. 22(a), (b) and (c) are a plan view of an embodiment of a butterfly deflector.
Figure 22B:
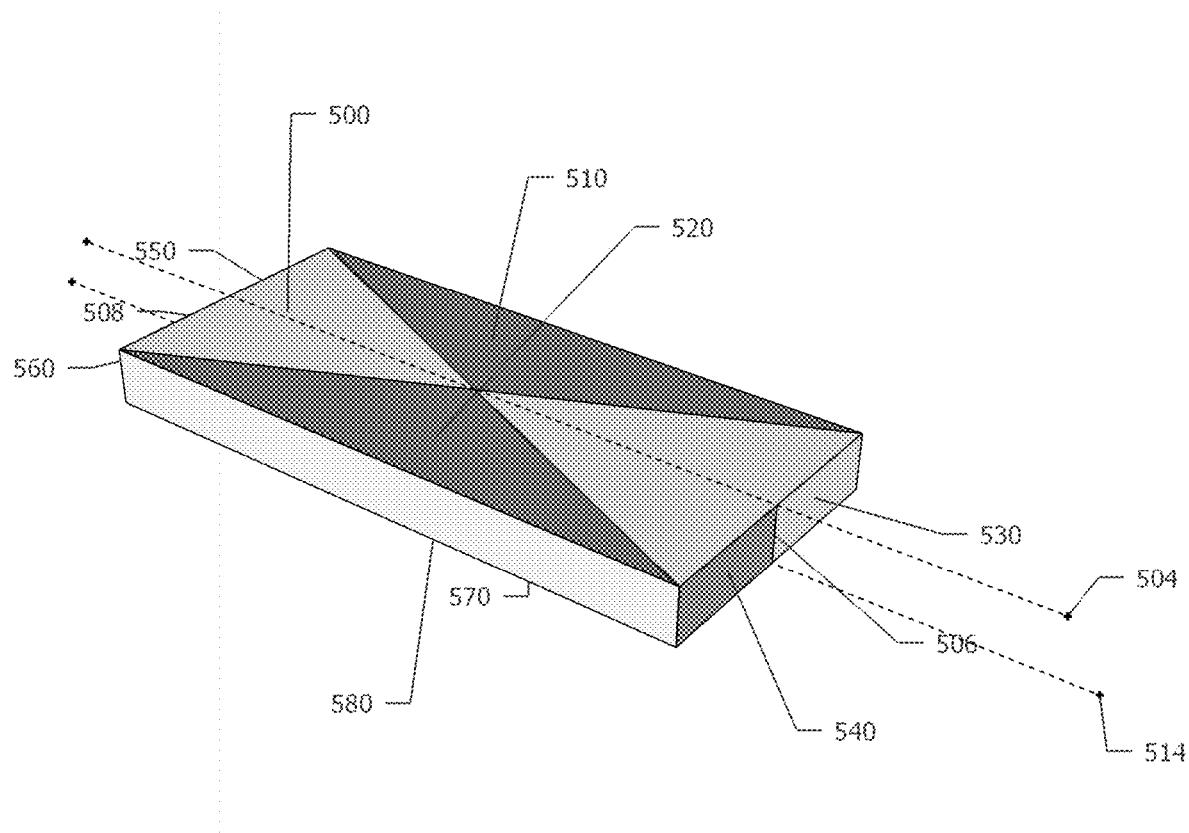

Another embodiment for deflecting the beam to a larger angle is shown in FIG. 22. Referring to FIGS. 22a and 22b, a single butterfly deflector comprises an EO bulk crystal 500 having a first top conductive electrode 510 and a second top conductive electrode 520 arranged on a top side 502 of EO bulk crystal 500. First top conductive electrode 510 and a second top conductive electrode 520 are triangular in shape and are arranged on the top side 502 such that each of said electrodes longest sides run along the outside edges of the top side's longest sides and the vertex of each triangle points to a centerline 504 of the top side 502. EO bulk crystal 500 further comprises a first end 506 and a second end 508 that are perpendicularly disposed between the top side 502 and a bottom side 512. The first end 506 comprises a light entering portion 530 and a first reflective portion 540. The second end 508 comprises a light exit portion 560 and a second reflective portion 550.

Figure 22C:
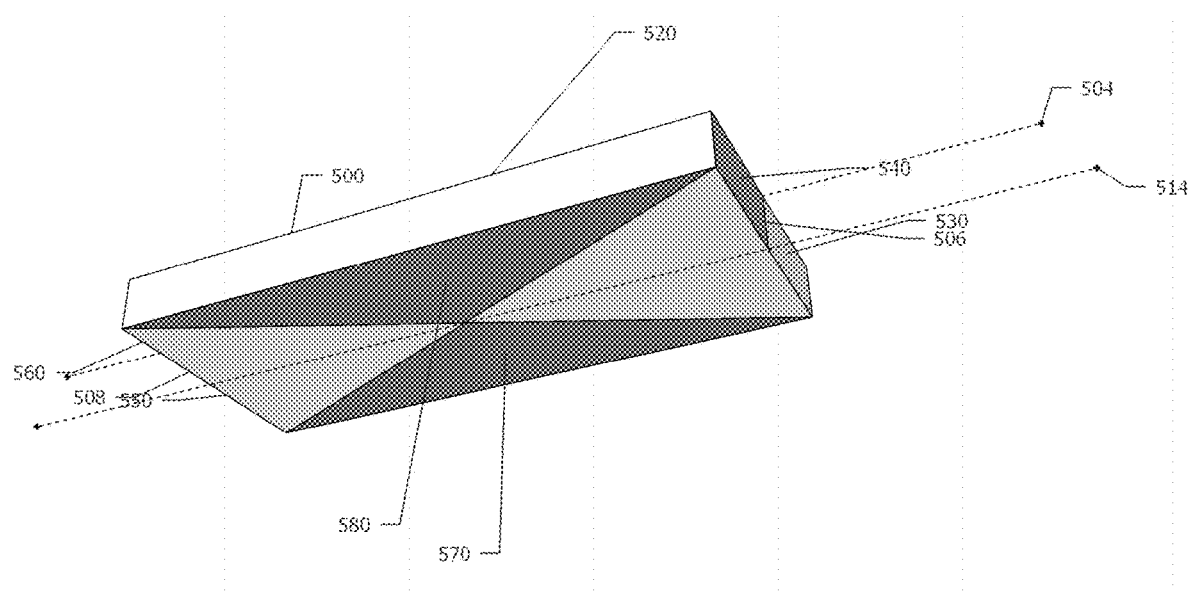

Referring to FIG. 22c, a first bottom conductive electrode 570 and a second bottom conductive electrode 580 are arranged on the bottom side 512 of EO bulk crystal 500. First bottom conductive electrode 570 is arranged opposite first top conductive electrode 510 and second bottom conductive electrode 580 is arranged opposite second top electrode 520. Consequently, the vertex of the first 570 and second 580 bottom electrodes point to a centerline 514 of the bottom side 512. The linear polarized beam enters crystal 500 at the light entering portion 530. The beam will be deflected by the crystal and hits the reflective portions 540, 550 and finally exits EO bulk crystal 500 after two times of reflection, thus, traversing the crystal three times. The angle of deflection provided by the butterfly deflector can be calculated using the following equation:

$$\theta_f = \frac{3L\Delta n}{W}$$

Where L and W are the length and width of the crystal. As shown, the angle of deflection in butterfly deflector will be simply three times more than conventional EO beam deflector with the same length, width and applied voltage.

The present invention has been described in an illustrative manner. It is to be understood that the terminology that has been employed herein is intended to be in the nature of words of description rather than word of limitation. While there have been described herein what are considered to be exemplary embodiments of the present invention, other modifications of the invention shall be apparent to those skilled in the art from the teachings herein and, it is, therefore, desired to be secured in the appended claims all such modification as fall within the true spirit and scope of the invention.

What is claimed is:

1. A beam steering device, comprising:
   at least one electro-optical (EO) crystal layer having a first side and an opposing second side;
   at least two electrodes arranged along the first side;
   at least one ground electrode arranged along the second side; and
   at least one insulator arranged to extend at least partially into the EO crystal layer, the at least one insulator positioned between adjacent ones of the at least two electrodes arranged along the first side;
   wherein a first one of the adjacent electrodes is constructed to impose a first voltage to change an index of refraction sufficient to cause a first optical path delay (OPD) change to a beam of light traveling through the EO crystal layer, and wherein a second one of the adjacent electrodes is constructed to impose a second voltage to cause a second OPD change to the beam of light traveling through the EO crystal layer, and wherein the first voltage is distinct from the second voltage.

2. The beam steering device of claim 1, wherein the at least one crystal layer comprises a material selected from a group of materials comprising EO crystals, a crystal layer, multiple crystal layers, an EO crystal layer, multiple EO crystal layers, liquid crystals, crystals with a linear change in index of refraction with respect to an applied electric field, and crystals with a quadratic change in index of refraction with respect to an applied electric field.

3. The beam steering device of claim 1, wherein the at least one insulator is located to reduce the spread of an electric field between the at least two electrodes.

4. The beam steering device of claim 1, wherein the at least one crystal layer comprises a material capable of having a change in index of refraction when an electric current is applied to the material.

5. The beam steering device of claim 1, wherein the at least one ground electrode comprises a series of electrodes where at least one of the electrodes in the series of electrodes is set at a non-zero value.

6. The beam steering device of claim 1 further comprising a mirror layer arranged along the at least one ground electrode, the at least one ground electrode arranged between the at least one crystal layer and the mirror layer.

7. The beam steering device of claim 1, wherein the at least two electrodes comprise at least two tilted electrodes.

8. The beam steering device of claim 1, wherein the at least two electrodes comprise a set of discrete, transparent electrodes.

9. The beam steering device of claim 1, wherein the at least one crystal layer comprises a ceramic EO crystal.

10. The beam steering device of claim 1, wherein the at least one crystal layer comprises a ferroelectric crystal.

11. The beam steering device of claim 1, wherein the at least one crystal layer does not comprise a liquid crystal.

* * * * *